United States Patent [19]
Ullmann et al.

[11] 3,822,374
[45] July 2, 1974

[54] ELECTRODE WIRE FEED MECHANISM FOR ELECTRO-EROSION MACHINES

[75] Inventors: Werner Ullmann, Locarno-Muralto; Victor Lämmler, Gordola; Silvano Mattei; Arno Sieg, both of Locarno; Peter Marti, Losone; Giuseppe Rezzonico, Bellinzona, all of Switzerland

[73] Assignee: A.G. fur industrielle Elektronik AGIE, Losone b. Locarno, Switzerland

[22] Filed: Aug. 30, 1972

[21] Appl. No.: 284,864

[30] Foreign Application Priority Data
Apr. 27, 1972 Switzerland.......................... 6312/72

[52] U.S. Cl................................................ 219/69 V
[51] Int. Cl.............................................. B23k 9/16
[58] Field of Search................................... 219/69 V

[56] References Cited
UNITED STATES PATENTS
3,504,155  3/1970  Opprecht et al..................... 219/81

*Primary Examiner*—J. V. Truhe
*Assistant Examiner*—Hugh D. Jaeger
*Attorney, Agent, or Firm*—Flynn & Frishauf

[57] ABSTRACT

Feed rolls and drawing rolls advance the electrode wire around guide knobs defining the working length and isolate the working length from the irregularities of unwinding and rewinding. The feed rolls operate at constant speed and the drawing or takeup rolls operate either at constant torque or at a higher constant speed designed to provide a constant amount of elongation of the electrode wire, the latter conditions being used if the wire is subject to plastic deformation at working tension. The guide knobs have abrasion resistant surfaces to define the working position of the electrode wire and electrically conductive surfaces for applying electro-erosion potential to the wire. Instead of rewinding used electrode wire on a takeup reel or gathering it in a rotating container, the used wire may be cut up for salvage or other disposal.

19 Claims, 13 Drawing Figures

ELECTRODE WIRE FEED MECHANISM FOR ELECTRO-EROSION MACHINES

The invention relates to a mechanism for continuously dispensing electrode wire or tape in an equipment for electro-erosion cutting of workpieces utilizing a wire or tape electrode. More particularly, the invention relates to apparatus in which two guide projections define a working length of the electrode wire or tape and in which the electrode wire or tape is unwound from a supply device and fed over one of the guide projections, while at the same time, it is pulled over the other guide projections and fed to a takeup or disposal device.

In electric discharge cutting or contouring equipment or in comparable electro-chemical cutting or contouring apparatus, wire or tape electrodes that may be used at the necessary small distance from the workpieces generally consist of a wire of a diameter from 0.01 to 1 mm or of a tape of corresponding cross-sectional area. The cross-section of such a tape can be elliptical or polygonal, for example, square or rectangular. The electrode wire or tape will be referred to frequently herein simply as "wire," but it should be understood that the discussion and explanation applies equally to electrode tape. The type of equipment in which electrode is used is referred to herein as "electro-erosion equipment," a term that includes both electric spark discharge cutting or profiling equipment and electro-chemical equipment in which the cutting or profiling is done by the action of an electrolyte through the influence of the electric field between the electrode and the workpiece. When a wire electrode is used, the wire is supplied wound on a supply reel. This supply reel, a takeup reel and guide elements for the electrode wire are mounted on the electrode advancing head the electro-erosion machine. The working region for the erosion process is located between two guides for the electrode wire. Relative movement between the taut wire electrode and the workpiece are produced by a control or feed system in accordance with the progress of the process and/or the prescribed geometry of the cut to be made. In this manner, straight or conical cut contours of the desired geometry can be cut into the workpiece.

Relative movement between electrode and workpiece is provided either by a copying control or by a numerical path control. At the same time, the electrode wire dispensing mechanism the wire is unwound from the supply reel to be wound up on the takeup reel, so that new electrode wire surfaces are continually introduced to the erosion process.

In known wire electrode feed mechanisms, the velocity and the tension of the wire electrode are not constant during operation, because the drive of the supply reel or delivery spool and the drive of the takeup reel or spool take no account of the properties of the wire material or of the changing circumference of the wire winding on the two reels. It is known that the properties of, say, a 100 meter length of wire are not uniform, the degree of uniformity being determined by its method of manufacture. In consequence, practical difficulties arise in the use of wire electrodes in electrode-erosion operations, such as, for example, uncontrollable stretching, accompanied by changes in length and in cross-section, of the wire electrode, and sometimes even rupture of the wire. The reason for the difficulties is that the known wire feed mechanisms are designed only for electrode wire having an idealized or a theoretical tension stretching characteristic. A theoretical characteristic of that sort is usually not present in practice. The known electrode wire feed devices are so constructed that the supply reel is braked mechanically or by an electric motor while the takeup reel is driven by an electric motor, or else they are built with a single drum having portions of two different diameters respectively, driven by an individual electric motor, disposed between the supply reel and the takeup reel.

In the type of electrode wire feed device last mentioned, the smaller diameter portion of the drum, with the assistance of a pressure roll, transports the wire from a freely running supply reel to the stretch which operates as the electro-erosion electrode. The larger diameter portion of the drum, likewise with the assistance of a pressure roll, transports the wire from the electrode working length to the takeup reel, in which case the takeup reel is also driven by an electric motor. In such a device the wire could be stretched at its working length at a ratio which corresponds to the ratio between the diameters of the two portions of the drum. Even though this arrangement overcomes one mentioned disadvantage the effect of the variation, during operation, of the circumferences of the windings on the two reels, the other disadvantage mentioned above remains, namely, uncontrolled variations in length of the electrode wire and even wire rupture resulting from changing properties of the wire material during operation. In the known electrode wire feed mechanisms above described it is feasible to use only electrode wire made out of elastic materials having a high modulus of elasticity, for example steel and tungsten. Electrode wire of low modulus of elasticity that operates under conditions of plastic deformation, as for example brass and soft copper, can give rise to difficulties when used in known electrode feed devices, either by breakage or by work hardening.

It is the object of this invention to overcome the disadvantages of known electrode wire feed mechanisms and to provide a constant drawing tension to the wire electrode which is adjusted during operation to the variations that may appear in the electrode material. The velocity and tension, moreover, is to be adjusted to the conditions of operation without change of the physical components. In the case of electric discharge cutting the velocities and tensions that are necessary are different from those required by electro-chemical cutting. These parameters, furthermore, are subject to additional variation for coarse, fine or super-fine cutting. When a wire electrode is brought to a reference surface of the workpiece (beginning point for contouring) before the actual beginning of the erosion process, it can be subjected to a higher electric potential than that used in the erosion process, in order to define the initial point as exactly as possible.

An important object of the invention is to enable wire electrodes to be used under conditions of plastic deformation as well as under conditions of elastic deformation. A still further object is to provide a wire electrode feed usable for cutting in either the electric discharge machining (EDM) or the electro-chemical machining (ECM) process, these two processes as mentioned before both coming within the term "electro-erosion."

SUBJECT MATTER OF THE INVENTION:

Briefly, in order to hold constant the tension of the electrode wire under either elastic or plastic deformation conditions of its material, the following components are provided:

a driven roll and a pressure roll on the supply side of the working portion of the electrode to feed the electrode wire over a guide projection to the working length at constant velocity, and a driven roll and a pressure roll disposed on the takeup side of the working length to transport the electrode wire from the working length over the other guide projection to the takeup side of the mechanism a greater constant velocity or with a constant torque at a velocity corresponding to the desired stretching of the electrode wire.

The invention will be described by way of example with reference to the accompanying drawings, in which:

FIG. 4b is a fragmentary plan view of the guide knob shown in FIG. 4a a;

Figure 1:
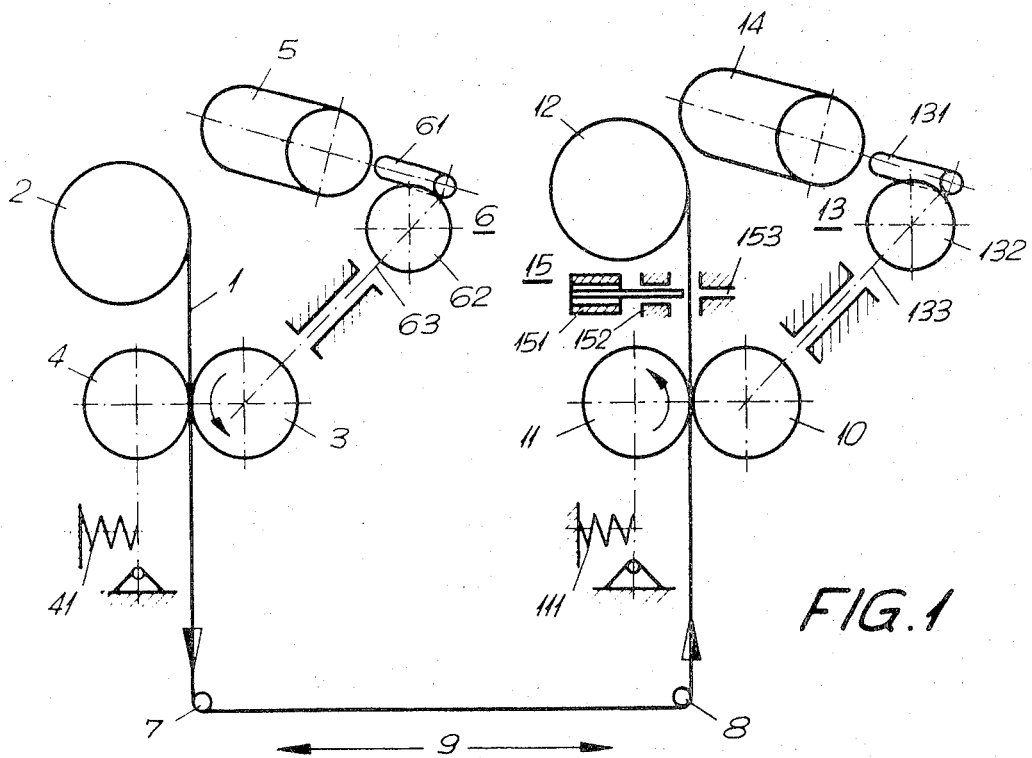
FIG. 1 is a schematic diagram showing the principles of the electrode wire feed mechanism.

As shown in FIG. 1, the electrode wire 1 is unwound from the supply reel 2. As mentioned above, tape could also be used for the electrode instead of the wire, but in the specific examples of the invention described below, the electrode will simply be referred to as a wire.

The electrode wire 1 passes between the driving roll 3 and a pressure roll 4 which is held against driving roll 3 by the force of the spring 41. The roll 3 is driven by the electric motor 5 through the gear transmission 6. It is important to provide a large amount torque to the driven roll 3 and that is furnished by providing a great deal of speed reduction in the coupling between the pinion 61 fixed on the shaft of motor 5 and the gear 62 fixed on the shaft 63 that is connected with the driven roll 3. For example, the transmission 6 may be constructed in the form of a worm gear drive instead of a pinion or bevel gear drive in order to get even more reduction of speed and increase of torque.

The arrangement just described produces an absolute separation of the wire transport from the influence of the supply reel 2, which can either be allowed to run free or can be driven by an electric motor not shown. The operation of the roll 3 alone determines the displacement of the electrode wire and only the velocity or the number of revolutions of that roll need be considered to determine the condition of the wire feed.

The roll 3 is driven to revolve at a constant velocity. It feeds the electrode wire 1 around a wire guide knob 7 on the supply side of the working portion of the electrode. From that guide knob the wire runs through the other guide knob 8 which is positioned on the takeup side of the working length and the wire is pulled around latter guide knob at the takeup portion of the mechanism described below. The two wire guide knobs 7 and 8 are simply projections adjacent to the path of the wire with a suitable guide groove and, since the wire does not go completely around them but as illustrated in FIG. 1 makes only a quarter turn at each knob, the knobs are not necessarily axially symetrical and in practice may conveniently have the construction illustrated in FIGS. 4a and 4b. Hence, they may be referred to as guide projections, or simply as guides.

The two wire guides 7 and 8 define working length 9 of the electrode wire 1. It is in the immediate neighborhood of this working length that the electro-erosion cutting of the workpiece (not shown) takes place. The electrode wire 1 is pulled around the wire guide 8 in the direction shown by the arrow in FIG. 1 by the driven roll 10, the wire passing between the roll 10 and the pressure roll 11 so that the former can effectively exert pull on the wire as it passes on to be fed to the takeup equipment. As shown in FIG. 1, the electrode wire is wound up on the takeup roll 12 which is adapted to be driven by an electric motor not shown. If desired, the electrode wire can also be pulled in the opposite direction around the wire guides 8 and 7.

The roll 10 is driven by an electric motor 14 through the gear transmission 13. The drive pinion fixed to the shaft of motor 14 and its associated gear 132 fixed on the shaft 133 connected to the driven roll 10 are so designed that transmission 13 produces a great reduction in velocity of rotation. For the purpose of the invention the driven roll 10 is rotated at a constant velocity which is greater than the velocity of the driven roll 3 on the supply side of the mechanism. As the result of the constant velocity difference the electrode wire 1 is subjected to the desired amount of stretching over its working length 9. If the electrode wire 1 is to be moved along the working length 9 in the direction shown by the arrows in FIG. 1 at a greater velocity, then the two electric motors 5 and 14 must change their rate of rotation in such a way that the velocity difference, in terms of the ratio surface velocities of the rolls 3 and 11, remains constant in every case. For another form of the invention, however, the driven roll 10 may be driven with constant torque, in which case the velocity of the driven roll 3 on the supply side is maintained at constant velocity. The constant torque applied to the driven roll 10 produces a constant pulling force on the electrode wire and accordingly stretches the latter in the desired way. If then it should be desired to feed the electrode wire around the working length 9 with higher or lower velocity during the electro-erosion process, the rate of rotation of the two electric motors 5 and 14 must then be changed in such a way that the moment applied to the wire electrode by the roll 10 remains constant whatever the velocity of the driven roll 3. If the electrode wire stretches more in many places than it does in others, for example on account of variation in the composition or quality of its material, then the motor 14 on the takeup side of the mechanism will apply a corresponding moment to the electrode wire so that the pulling tension always remains constant. The electrode wire can be made of a material that stretches either in elastic or in plastic deformation, as will be further described below.

Figure 9:
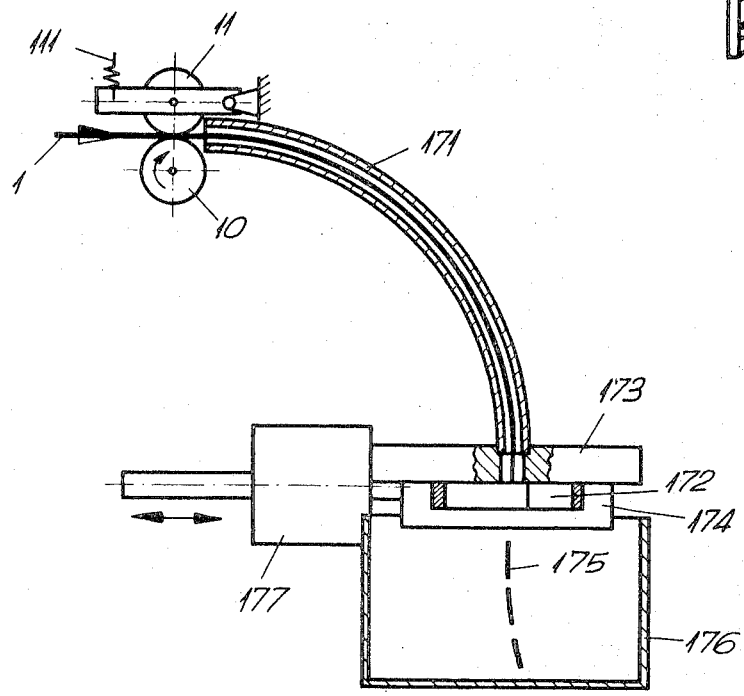
FIGS. 9 and 10 are respectively a side elevation and a plan view of one form of device for cutting up the electrode wire on the takeup side of a feed mechanism according to FIG. 1.
Figure 10:
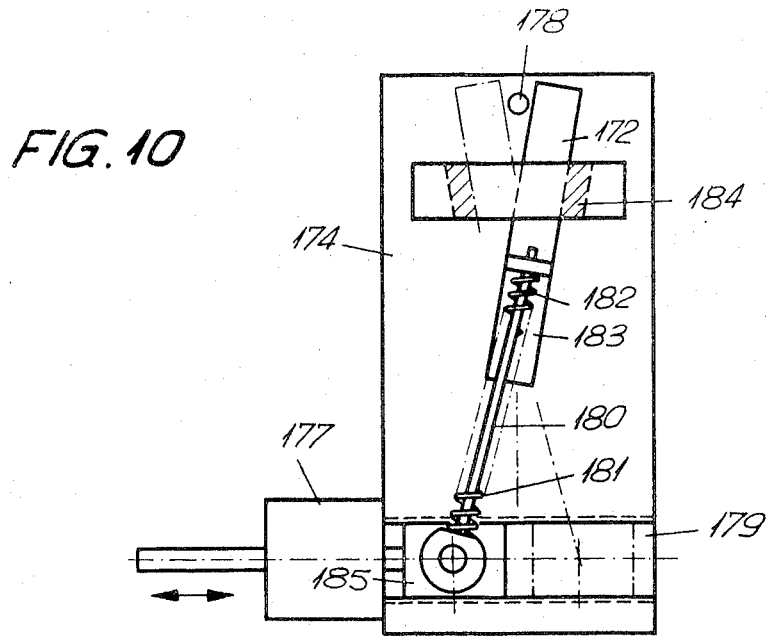

Between the takeup reel 12 and the wire pulling pair of rolls 10, 11 there can be interposed a cutting device for example a knife 14 operated by an electro-magnet 141 for cutting through the electrode wire. The cutting operation is performed by advancing the knife blade into a correspondingly shaped slot 153. Another type of cutting device is shown in FIGS. 9 and 10. If the cutting device of FIG. 1 or of FIGS. 9 and 10 is used, a takeup reel 12 is no longer necessary. In some cases the re-use of the electrode wire for repeated electro-erosion work has proved to be impractical because of the extent to which its cross-section and its material is changed by being used the first time in the electro-erosion process. In any event, whether the wire is taken up on a takeup device or whether it is cut up into lengths for disposal, equipment.

It follows, then, that a wire feed mechanism according to the principles of FIG. 1 protects the working portion of the electrode wire against all external disturbances either from the supply side or the takeup side of the mechanism, thus, on both the wire feed or supply side and the wire pull or takeup side a constant wire velocity and a constant tension can be provided to the working length 9 of the electrode wire 1. Because of this constant tension, disturbances tending to affect the tension, for example the effect of variations in the composition of the electrode wire, will be compensated for.

The tension applied to the electrode wire is likewise not changed if the velocity of feed of the wire is modified during operation. The modification of the feed velocity of the wire is necessary for changing from one kind of erosion process to another (coarse or fine erosion) and must also be adjusted to the wire size if that is changed. The rates of rotation of the two electric motors 5 and 14 are controlled so that the aforesaid conditions are always fulfilled.

Figure 2:
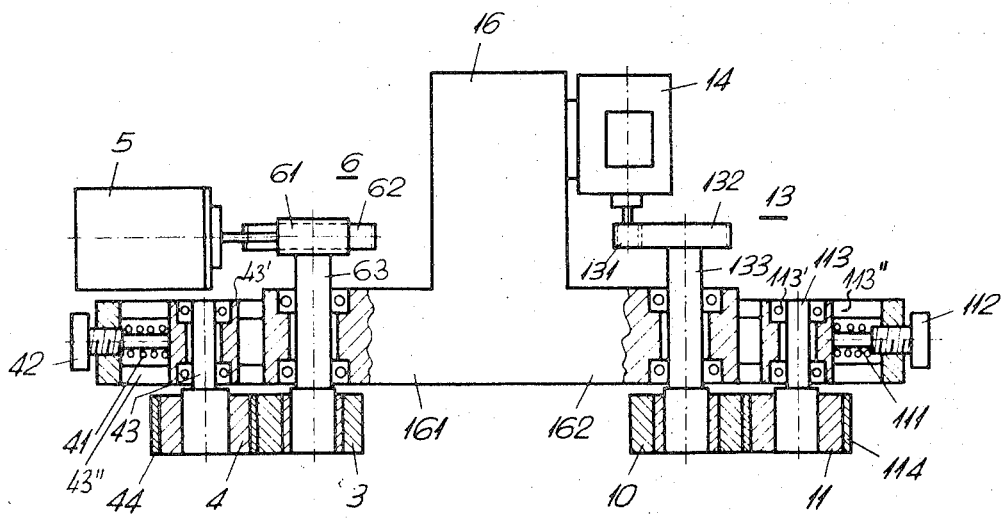
FIG. 2 is a horizontal section, seen from above, of a practical embodiment the principle illustrated in FIG. 1.

If the electrode wire with which electro-erosion cutting is to be performed is made of a material with a very high modulus of elasticity, as for example steel or tungsten, the rates of rotation of the electric motors 5 and 14 are so adjusted that the rolls 3 and 4 feed the electrode wire at constant velocity to the working length 9 while the rolls 10 and 11 exert a constant pulling moment on the electrode wire 1. A practical form of construction particularly suited for this case is shown in FIG. 2. The curve a of the graph set forth in FIG. 5 relates to FIG. 2 and shows the stretching characteristic under constant pulling force of an electrode wire of steel or tungsten within the range of conditions producing elastic deformation. The force $P$, which is plotted as the ordinate of FIG. 5 produces an elongation $\Delta l$ plotted as abscissa of the electrode wire material. It is important in this case that the moment on the wire pulling or takeup side of the working length should be constant. The rate of rotation of electric motor 14 is accordingly adjusted to that requirement.

If electrode wire of material having a small modulus of elasticity is to be used for electric erosion, the transport velocity of the wire electrode must be smaller on the feed side than on the takeup side and in this case both of these transport velocities are constant. The rate of rotation of electric motor 14 and thereby the transport velocity of driven roll 10 and pressure roll 11 on the takeup side of the system must be set at a higher value than the rotation rate of electric motor 5 that determines the transport velocity of driven roll 3 and pressure roll 4 on the supply side. For this case the form of construction illustrated by way of the electrode wire in this case can, for example be soft copper, brass or the like, the stretching characteristic of which is shown in curve $b$ in FIG. 5. This curve again shows the applied force $P$ as ordinate, which produces an elongation $l$ as abscissa. The electrode wire here is within the range of conditions producing plastic deformation. The wire velocity and the pulling force across the working length 9 are accordingly constant. Even with so-called "soft" electrode wires the wire tension can be regulated during the electro-erosion process so that there will always be a constant pulling force on the wire, this being done by variation of the rate of rotation of electric motor 14 and, hence, that of rolls 10 and 11. This is necessary for practically every electrode wire because the material composition and quality of the electrode wire is not constant over its entire length. Since the known electrode wire feed mechanisms did not possess the capability of such regulation, only the most carefully produced electrode wire could heretofore be used for electro-erosion. The wire feed mechanism of this invention now makes possible use in electro-erosion of more cheaply produced electrode wire. The examples given here hold for both wire and tape electrodes and for electrode material of either small or great modulus of elasticity i.e., whether according to curve $b$ or curve $a$ of FIG. 5.

As previously mentioned, FIG. 2 shows the form of construction of a specific example of wire feed mechanism embodying the principles described in connection with FIG. 1. The frame or support 16 on which various components of the wire feed mechanism are mounted is fixed on the movable head, that is, the main feed mechanism, or an electro-erosion machine. The electric motor 5 drives the driven roll 3 through a worm gear transmission 6 composed of the worm 61 and its meshing gear 62, which is not fully shown in the figure since it lies in back of worm 62. Both the roll 3 and the gear 62 fixed on shaft 63 which is mounted in a bearing set in one arm 161 of the frame 16. Pressure roll 4 is held by its shaft 43 in a bearing 43' slidably mounted in a slot 43'' in the support arm 161, where it is subject to the action of spring 41, which presses roll 4 firmly against driven roll 3. The compression of spring 41 and hence the pressure applied to roll 4 can be adjusted by means of the screw 42. The surface of pressure roll 4 which comes into contact with driven roll 3 is coated with a soft material 44. This soft facing serves to protect the profile of the electrode wire being fed into the electro-erosion zone. The supply reel 2 and the guide projection 7 are not shown in FIG. 2, but it will be readily understood that the supply reel is located above the rolls 3 and 4, and the guide projection 7 below these rolls (FIG. 2 being a top view of the mechanism, shown mostly in section).

On the takeup side of the mechanism electric motor 14 drives the equipment shown mounted on the other arm 162 of the frame 16. In contrast to the basic diagram of FIG. 1, the gearing of motor 14 is not a worm gear, but a normal gear drive 13, in order that a constant pulling force may be produced on the takeup side that will exert a constant moment on the electrode wire 1 while the electrode wire is being fed at constant velocity to the working length 9 (not shown in FIG. 2) located between the guides 7 and 8 (respectively below rolls 3, 4 and rolls 10, 11 and hence likewise not shown).

The gear drive 13 consists, as shown in FIG. 2, of the drive pinion 133 fixed on the shaft of motor 14 and the gear 132 fixed on the shaft 133, which is mounted in a bearing set in arm 162 of frame 16 and carries roll 3 fixed on its other end. Pressure roll 11, of which the axle 113 is held in a bearing 113' slidably mounted in a slot 113'' in support arm 162, is pressed against driven roll 10 by the spring 111, the force of which is adjustable by means of the screw 112. The surface of pressure roll 11 that comes into contact with driven roll 10 can be a metallic surface or can be coated with a soft material, which may be either rubber or a synthetic composition.

Takeup reel 112 is located above the rolls 10 and 11 and is not shown in FIG. 2, since it is above the plane of the sectional representation in FIG. 2. The wire guide 8, which is below reels 10 and 11 is likewise not shown since the little of it that would be visible if shown would merely complicate the drawing. If a cutting device (FIG. 15) is used in the arrangement of FIG. 2, like the takeup reel 12, it would be above the rolls 10 and 11.

Figure 3:
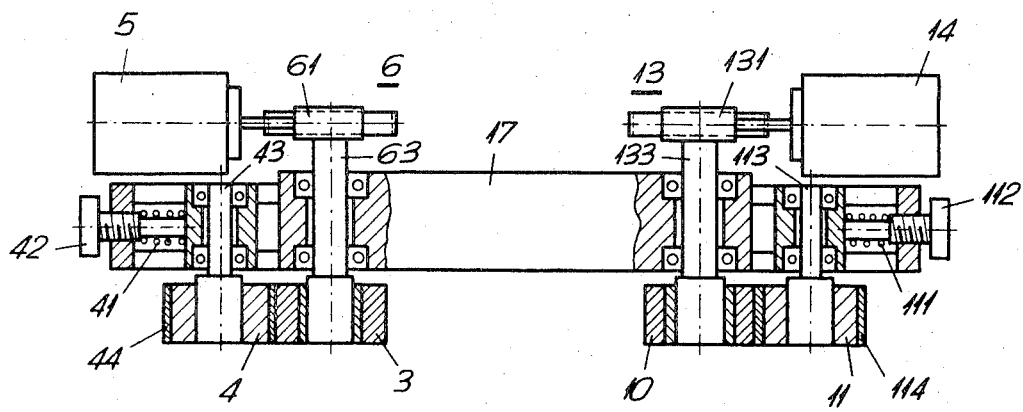
FIG. 3 is a horizontal section, seen from above, of another practical embodiment of the principle illustrated in FIG. 1.

FIG. 3 shows a second specific embodiment of the principle shown in FIG. 1, again in a top view mostly in horixontal section and partly in plan. Where the components are the same, as in FIG. 2, they have the same reference numbers in FIG. 3. This second embodiment differs from that of FIG. 2 in having a worm gear drive 13 on the takeup side and also in the different shape of the supporting frame 17 compared to the corresponding supporting frame 16 of FIG. 2. The worm gear drive enables the roll 10 to be driven at a highly constant velocity which is greater than the constant velocity of the roll 3 on the supply side. A constant pulling displacement is, thus, exerted on the electrode wire 1.

The embodiment of the invention shown in FIG. 3 is, furthermore, designed to be suitable for equipment in which a plurality of electrode wire feeding mechanisms are mounted on a common electrode advancing head (machining feed motion member). In such an arrangement, several wire electrodes may simultaneously cut a plurality of contours in a workpiece. Just as in FIG. 2, the guides 7 and 8 below the plane of the section in FIG. 3 and the reels 2 and 12 above it are not shown in FIG. 3.

Figure 6:
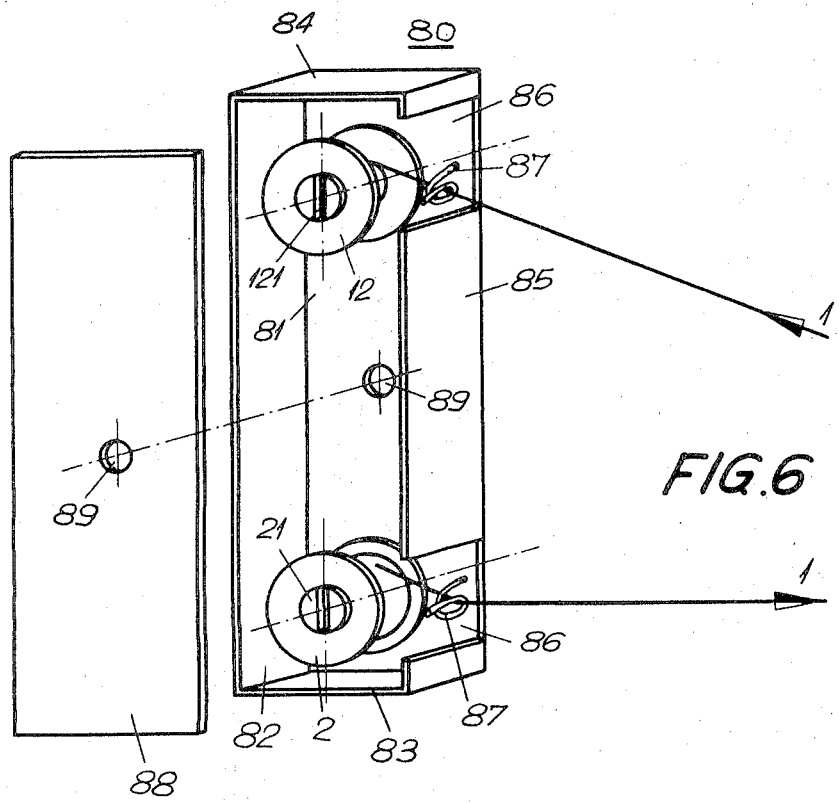
FIG. 6 is a perspective view illustrating the arrangement of several electrode wires on a cassette basis.

The electrode wire feed mechanism illustrated in FIG. 3, including the elements just mentioned, not appearing in the figure, can be produced as shown in FIG. 6, in the form of a so-called cassette. A plurality of such cassettes can be mounted on the electrode advancing head of the electro-erosion machine, in which case the advancing head must be fitted with corresponding holders for the cassettes. With such a cassette system, multiple cut operations can easily and simply be fitted to specific requirements of mass-production tasks.

Figure 4A:
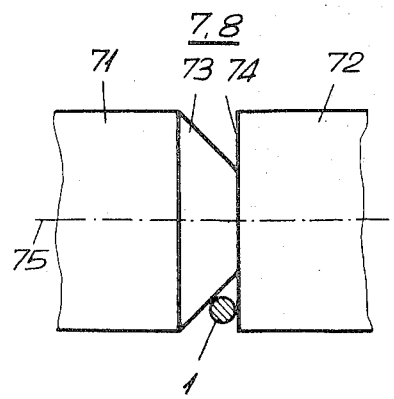
FIG. 4a is an elevation view of the guide knob for use in the apparatus of FIG. 2 or FIG. 3.
Figure 4B:
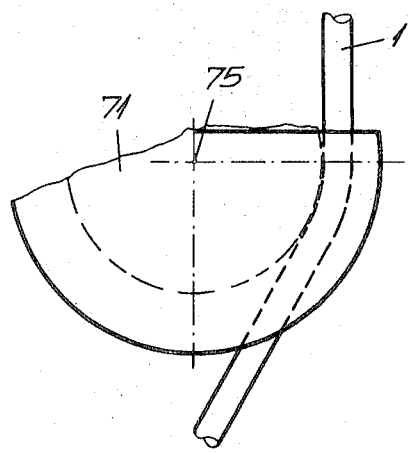

FIGS. 4a and 4b show in great magnification one form in which the wire guide knobs 7 and 8 may be made. A wire guide knob has two functions to fulfill. It is responsible for the exact geometrical position of the electrode wire 1 which must assure that this position will either not change or change extremely little during the electro-erosion process. Then, because of operating voltage necessary for electro-erosion supplied to the wire guide knob, each of the knobs must provide a very good electrical contact to the electrode wire 1, so that the electric connection resistance will not change or will change only very little during the electro-erosion process. The form of construction shown in FIGS. 4a and 4b meets these two conditions. The guides 7 and 8 cpmprise, according to FIG. 4a, two cylindrical semicylindrical parts respectively designated 71 and 72. Part 71 has a conical bevel on the side or end joining part 72. The cone frustum thus formed is affixed to the planar cut side or end 74 of the other cylindrical part 72 by a force or screw joint or by welding, soldering or by the use of an adhesive. Cylindrical part 71 is composed of an abrasion resistant material, for example, ceramic, sapphire or nickel chromium steel. The conical surface 73 is polished and lapped, so that the electrode wire 1 can slide over it with little friction. The other cylindrical part 72 is composed of a material with low abrasion resistance, but with good electrical conductivity.

The wire guide knobs 7 and 8 are arranged as shown in FIG. 1, so that the electrode wire 1 is gently bent about the axis 75 of the knob, as shown in FIG. 4b. The wire guide knobs 7 and 8 are so constructed that the electrode wire 1 guided around them is not stressed in the range of its plastic deformation characteristic even at the greatest bending stress provided by the guide. The wire guide knob is not, however, able to turn on its axis 75, so that during the electro-erosion operation, the tensioned electrode wire 1 slides over the cone 73 and is pressed against the surface 74. This takes place always with the same surface area of the electrode wire so that the electrical connection resistance does not change. No disturbances are accordingly produced in the operating voltage by this even and uniform contact engagement. The precise geometrical position of the electrode wire remains practically constant during the entire electro-erosion process by virtue of the combination of the cone 73 with the flat surface 74. If the electrode wire 1, in the course of operation, cuts into the less abrasion resistant surface 74 of the cylindrical part 72, the cone 73 causes it to shift slightly towards the axis 75 to come in contact with a new and unworn portion of the surface 74. If after lengthy operation, the electrode wire should have cut too deeply into the surface 74, the wire guide knob can be twisted a little on its axis 75 so that the surface of the electrode wire then comes into contact with a new sector of the surface 74. The wire guide knobs 7 and 8 can also be shaped so that the electrode wire 1 runs in a V-shaped groove. In that case, surface 74 is also made conical.

In FIGS. 4a and 4b the body of the wire guide knob is shown as cylindrical. It is evident from the above description that the cross-section of the wire guide knob could be a section or a segment of a circle. This is readily seen from FIG. 4b, for example, supposing that only a wuarter of the circular cross-section were present. This holds as well for the part 72 as for the part 71: both, may have a cross-section of either a section or a segment of a circle. It is further to be noted here that the wire guide knobs 7 and 8 need not have circular cross-section at all, but may have cross-sections deviating from circular form, and that the groove in which the electrode wire 1 is guided can also deviate from the form shown in FIG. 4a. For example, the groove can have an arcuate conoid 73 and the surface 74 of the part 72 can likewise be curved.

Figure 5:
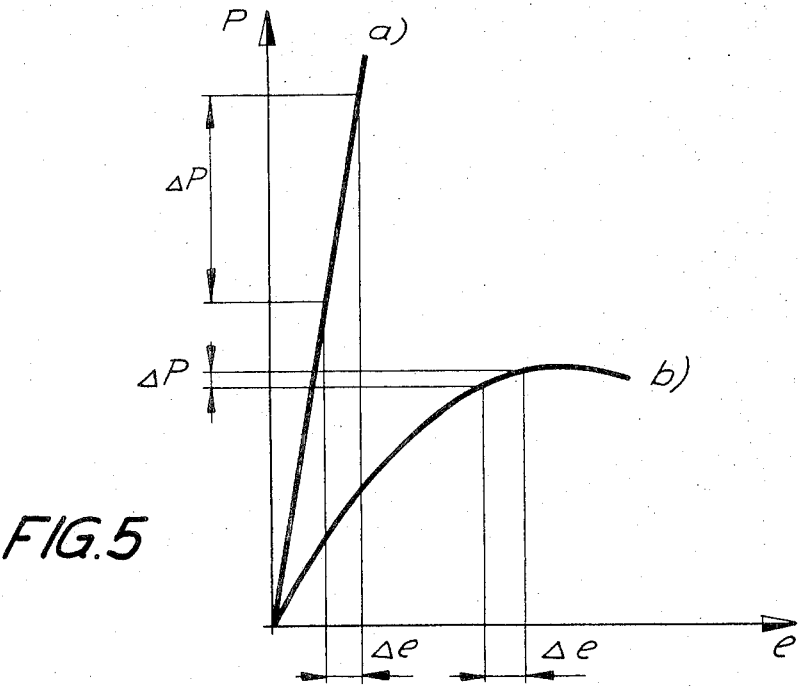
FIG. 5 is a graph of the stretching characteristics of different electrode materials.

The curves shown in FIG. 5 illustrating the stretching characteristic of electrode wire or tape materials, namely curve a for a material with very high modulus of elasticity and curve b for a material with low modulus of elasticity, have already been discussed in connection with FIG. 1.

FIG. 6 shows an arrangement for the provision of two or more electrodes in a single electro-erosion machine. Such an arrangement is of advantage in the mass production cutting or slicing of workpieces by electro-erosion. The supply reel 2 and the takeup reel 12 are mounted in a cassette 80. These two reels or spools are mounted on axles 21 and 121 respectively, which are in turn mounted on the base plate 81 of the cassette 80. The side walls 82, 83, 84, and 85 are fixed on the base plate 81. Flits 86 are provided in the side wall 85 opposite the reel 2 and 12 to allow the electrode wire to pass. Guides 87 are mounted on base plate 81 to lead the electrode wire properly from supply reel 21 to rolls 3 and 4 of the supply side and likewise to lead the wire properly from rolls 10 and 11 on the takeup side to takeup roll 12. Rolls 3,4 and 10,11 and likewise wire guide knobs 7 and 8 are not shown in FIG. 6.

The direction of transport of electrode wire 1 is shown by arrow heads drawn on the wire in FIG. 6. The cassette 80 may be closed with a cover 88. Holes 88, 89 are provided respectively in base plate 81 and cover 88 for fastening the cassette to the controlled advancing head of the electro-erosion machine. A number of cassettes 80, even a large number, can be put together to form a multiple unit which can then be mounted on the advancing head of the machine as a group by means of the holes 89.

Normally each cassette 80 will have drive and guide elements as shown in FIG. 1 — rolls 3,4,10 and 11, wire guide knobs 7 and 8, and electric motors 5 and 14 with their gear drives 6 and 13. There is also the possibility, however, that several electrode wires 1 can be driven in common with the same transport elements 3,4 and 10,11. The threading of the electrode wire, preparatory to the erosion process, can take place either with a device of the types shown in FIGS. 11 and 12 or without such devices.

Figure 7:
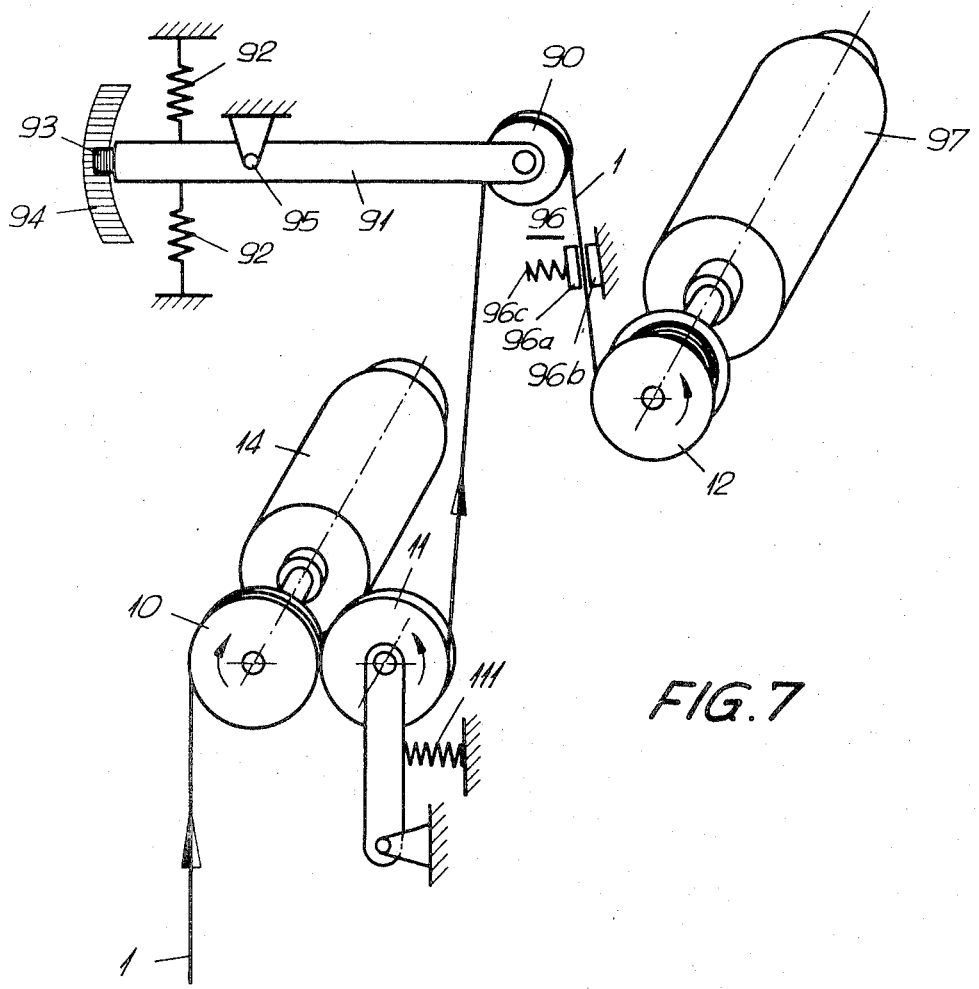
FIG. 7 is a diagramatic perspective view illustrating supplementary equipment for the takeup side in mechanism according to FIG. 1.

FIG. 7 shows auxilary apparatus providing for winding up the electrode wire 1 on takeup reel 12 with force-equalizing separation from rolls 10 and 11 by means of a compensating loop. The electrode wire 1 coming from guide 8, in contrast to the basic diagram given in FIG. 1, pulls around part of the circumference of both rolls 10 and 11. In this manner a better pressure engagement of the rolls is produced. As already explained in connection with FIG. 1, pressure roll 11 is pressed against driven roll 10 in FIG. 7 by the spring 111. Electric motor 14 provides the drive to roll 10. In contrast to FIG. 1 the gear drive 13 does not appear in FIG. 7. Between roll 11 and takeup reel 12, the electrode wire forms a loop, being led over the pulley 90. As shown in FIG. 7, pulley 90 is mounted on one end of a compensating lever 91. The latter, pivoted on bearing 95, is normally held in the middle position shown, by positioning members 92. At its other end the compensating lever 91 moves the slider 93 of the potentiometer 94. After leaving pulley 90, electrode wire 1 is led over a device 96 that adjusts the reeling force. Device 96, in its simplest form, consists of a mechanical brake with brake shoes 96a and 96b, the shoe 96a being adjustable, as shown symbolically by the variable spring 96c. Takeup roll 12 is driven by an electric motor 97.

The arrangement of FIG. 7 serves, as already explained, to establish a compensating loop. If the compensating lever 91 is moved out of the middle position in which it is shown in FIG. 7, as the result of a greater or smaller tension of electrode wire 1, then potentiometer 94 provides a signal over a supervisory control system, not shown, which causes the speed of motor 97 to be modified in such manner that compensating lever 91 regains its middle position. By these means, the winding up of electrode wire 1 on takeup reel 12 is performed in a manner that keeps always the same tension on electrode wire 1.

In the compensating loop example shown in FIG. 7, the positioning members 92 are in the form of springs. Such a case is known as a loop regulated by spring force and balance lever. Loop regulation by gravity, with the help of a compensating pulley that rides up and down, can be provided instead. The active element of loop regulation must always have a great excursion with small changes in tension. In place of the potentiometer 94 and its slider 93, there may be used various kinds of contacts, photo cells and resistances or so-called "proximity switches" that are adapted to provide signals for controlling motor 97 which drives takeup reel 12. The compensating loop element — for example the pulley 90 and the compensating lever 91 — can also be given a motion suited to any of various forms of winding. That is to say, that compensating element may have a motion suited to winding the electrode wire on a cross wound or a layer wound takeup spool. There is also the possibility that the brake 96 in some particular embodiment of the invention could be movable while electrode wire 1 is cross wound or layer wound on the takeup spool 12.

Figure 8:
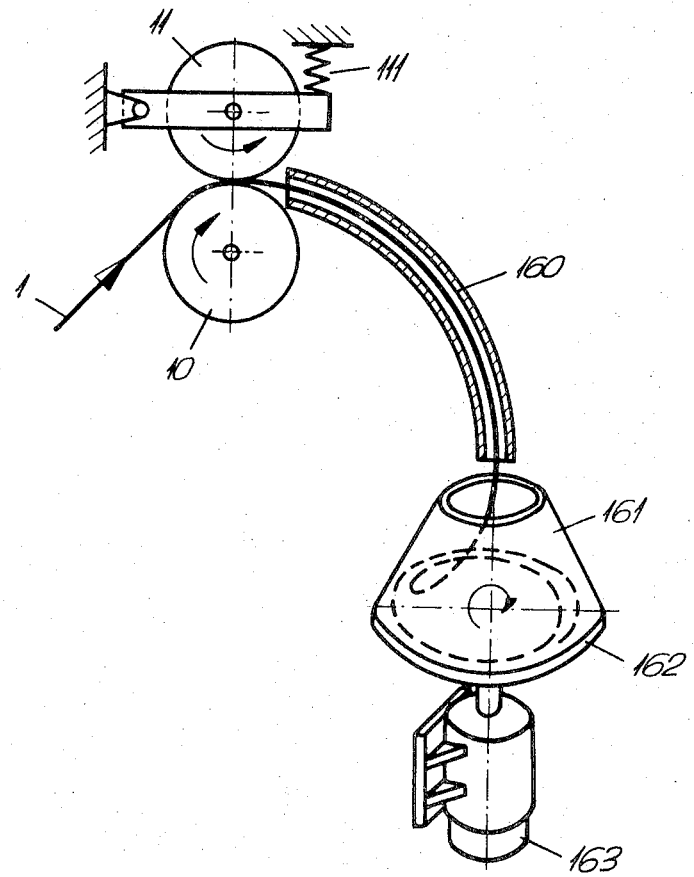
FIG. 8 is a perspective view, partly in section, of a device for the orderly collection of used electrode wire from the takeup side of the feed mechanism shown in FIG. 1.

As already stated in connection with FIG. 1, the takeup reel or spool 12 is not absolutely necessary. The wire 1 can be disposed of in other ways. FIG. 8 shows equipment for orderly gathering of the electrode wire 1 which issues from the rolls 10 and 11 which draw it from the guide 8 (not shown). At the exit of the two rolls 10 and 11 a guide tube 160 is provided. Guide tube 160, which may for example be made of glass or of synthetic material, leads electrode wire 1 to a gathering container 161. The container 161, as illustrated, is mounted on a rotating disk 162, which is driven by electric motor 163. If now the electrode wire 1 is brought into the bell shaped container 161 through guide tube 160, the electrode wire will be collected in an orderly fashion as the container rotates, for example in the direction shown by the arrow. Of course the velocity of rotation of container 161 is determined or adjusted to suit the feed velocity of electrode wire 1. Guide tube 160 is so designed that it provides enough pile-up space for the electrode wire in the event of any stoppage in the course of regular gathering.

As already stated in connection with FIG. 1, it is not necessary in every case to take up electrode wire 1 on the takeup spool 12 or any other gathering device, because the wire electrode frequently cannot be re-used for further electro-erosion work. In such cases the electrode wire is cut up into small snips by the cutting device 15 shown in FIG. 1. These snips are collected in a container and discarded to waste or salvage.

In FIG. 9 another specific example of the cutting device 15 of FIG. 1 is shown. The electrode wire 1 arrives at the rolls 10 and 11 from wire guide knob 8 (not shown) and is propelled into a guide tube 171. The guide tube, which may be made of glass or of a synthetic material, leads the electrode wire 1 to the reciprocating knife 172. The latter, which swings back and forth in a housing 174 mounted on the cutting plate 173, cuts the electrode wire into snips 175, that fall into the collecting containiner 176. The reciprocating knife 172 may be moved in swinging motion by an electromagnet 177, for example. The guide tube 171 is so constructed that it has enough pile-up space for electrode wire 1 if an obstruction should occur during cutting.

FIG. 10 is a plan view of the reciprocating knife apparatus of FIG. 9. The two edged knife 172 mounted on the housing or support 174 cuts the electrode wire into small snips as the electrode wire advances through the cutting plate 173 (not shown in FIG. 10). The cuttings fall through the opening 178 provided for the purpose into the collecting container 176. The electromagnet 177 operates the ball joint 185 in a guide channel 179 provided in the housing or casing 174. The back and forth movement thus produced is communicated to the reciprocating knife proper 172 over the connecting member 180 which is provided with energy storage springs 181 and 182 at both ends. The knife blade 172 is pivoted on a bearing 183 mounted in the housing or casing 174. The movement of reciprocating knife 172 is limited by damping members 184 provided on both sides.

The cutting devices of FIG. 1 and of FIGS. 9 and 10 are specific examples for illustration, but in principle all vibrating and rolling cutting processes can be used for mechanically cutting up the electrode wire 1 into pieces. It may also be observed that an elastomer material (rubber roll) may be used as an opposing element to the cutter. The breaking up of the electrode wire into pieces can also be carried out electrically by thermal spot melting. For example pulses of current or transverse discharges can be used to produce electrical cutting of the electrode wire.

It has been tacitly assumed up to this point that prior to the electro-erosion process proper the wire electrode or tape electrode 1 could be brought up close to a reference surface of the workpiece in a manner suitable to define the beginning point of the contour to be produced in the workpiece by erosion. This is possible only in those cases in which the beginning point of the contour to be cut by electro-erosion lies on a surface of the workpiece. If the beginning point of the contour to be produced by erosion lies inside the workpiece, this initial point must be bored before the actual beginning of the erosion cutting process proper. Heretofore the initial point or line was in such cases bored mechanically or was bored by electro-erosion with a separate bore electrode. Thereafter, the workpiece was set in the electro-erosion cutting machine and the electrode or electrodes were threaded by hand into the workpiece.

Figure 11:
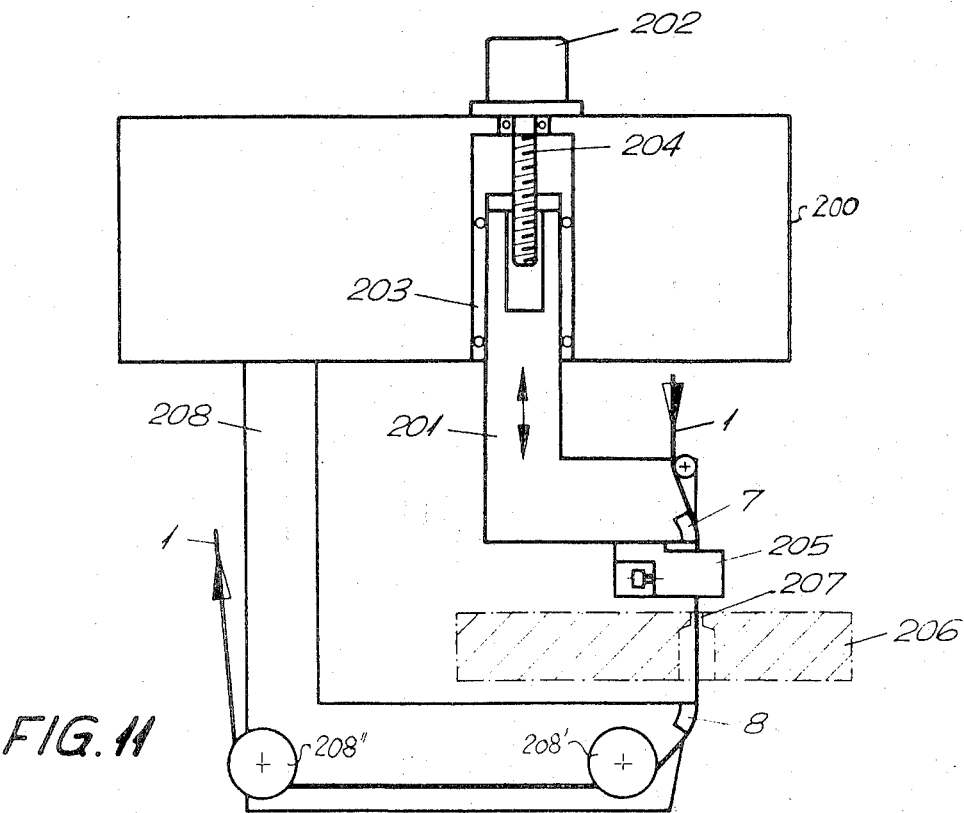
FIG. 11 is a diagramatic elevation view of an electrode feed mechanism according to FIG. 1 provided with an attachment for preparing a workpiece for electro-erosion machining.
Figure 12:
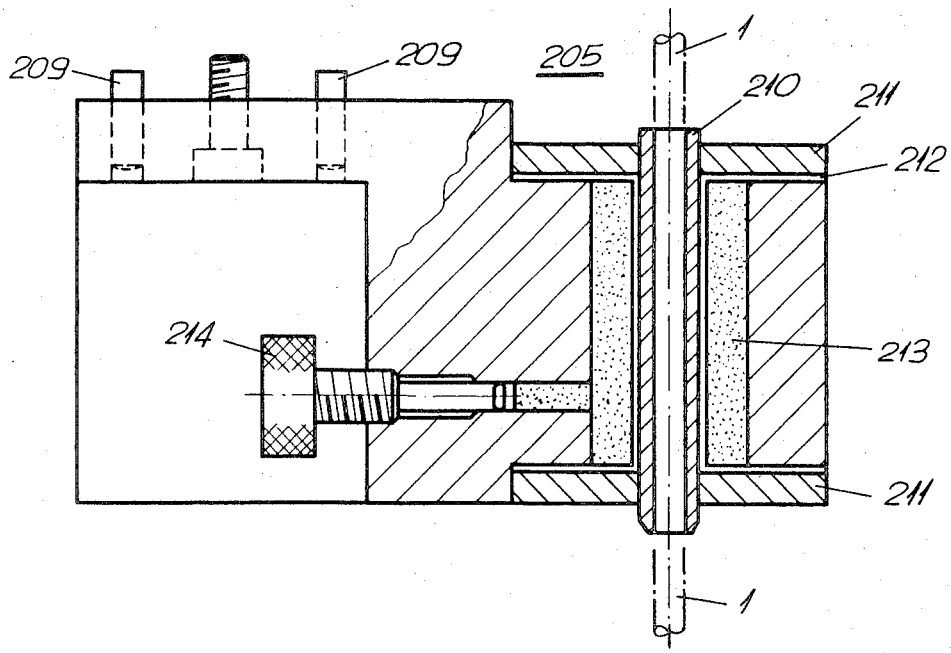
FIG. 12 is a sectional view of the aforesaid attachment shown in its working position in FIG. 11.

In FIGS. 11 and 12 means are shown with which such pre-boring or pre-eroding, and also the threading by hand, are no longer necessary. This device produces the beginning point in the workpiece by erosion with the same electrode with which the electro-erosion cutting is subsequently performed. This brings forth the added advantage that the beginning point has the same form as the wire or tape of the electrode 1 with which the erosion cutting is to be done.

As shown in FIG. 11 the holder 201 for the wire feed mechanism is mounted on the head 200 of an electro-erosion machine the rest of which is not shown. Holder 201 is so mounted in the longitudinal guide 203 that a servomotor 202 can move holder 201 up or down in the direction shown by the double pointed arrow, operating through the threaded shaft 204. The electrode wire 1, which is transported from the rolls 3 and 4 (not shown) of the supply side of the feed to the wire guide knob 7, is advanced into the clamping device 205 mounted at the lower end of holder 201. Electrode wire 1 is advanced far enough in clamping device 205 to allow a predetermined length to project out of the bottom of the clamping device. The length is determined by the depth of the beginning position to be bored in workpiece 206 and by the wearing away of the electrode wire which is expected to take place during boring. In order that the free end of the electrode wire may stick out as straight as possible, it can be preliminarily stretched by a previous elongation or pull apart procedure in the case of extreme requirements. For example, where a freedom of strains in the material is also required, such elongation or pulling apart should be carried out at higher temperature (recrystalization temperature). The last mentioned procedure can be performed by putting the wire end to be straightened suitably in an evacuated chamber or a chamber filled with inert gas, then electrically (for example inductively) heating it to a glowing condition and at the same time applying tension.

When the right amount of the electrode wire protrudes from the clamping device 205, the wire is then clamped fast in the clamping device. Thereafter servomotor 202 moves holder 201 in the direction of the surface of workpiece 206, so that the opening 207 in workpiece 206 can be formed by electro-erosion. In FIG. 11 only one opening or bore 207 of small depth is shown. After the formation of the bore 207 the forward end of electrode wire 1 is advanced, the wire being fed by the mechanism for this purpose, around the lower wire guide knob 8 and from there over the symbolically shown pulleys 208' and 208" to the rolls 10 and 11 (not shown) of the takeup side transport mechanism. The wire guide knob 8 as well as the two pulleys 208' and 208" are mounted on a lower support member or holder 298 which is fixed to the head 200 of the electro-erosion machine. It should be further mentioned that clamping device 205, which is detachably mounted on holder 201 is centered on the position which the electrode wire must have during electroerosion cutting.

The clamping device 205 is shown in section in FIG. 12. The fastening means 209 serve to mount and adjust the clamping device 205 on the servo controlled holder 201. The clamping tube 210, which takes up the electrode wire 1 coming from the wire guide knob 7, is held fast in a centering flange 211. Clamping tube 210 is surrounded by a resilient compression element 212 the most even pressure distribution type. This resilient compression element can for example be an anular spring or a cup spring. In FIG. 12 the compression element 212 consists of a container with a pressure fluid 213. Be actuation of the pressure screw 214 the pressure element 212 is pressed against clamping tube 210 by the pressure fluid 213, so that the electrode wire 1 fed through clamping tube 210 may be held fast.

The end of electrode wire 1 is pulled out of the lower opening of clamping tube 210, the inner diameter of which exactly corresponds to the diameter of the wire. The length to which it is pulled out corresponds to the depth to be bored for the opening 207 less the erosion to which the electrode itself is subjected in the boring operation. After the erosion boring of the initial position for the cutting operation the pressure screw 14 is actuated in the opposite direction so that clamping tube 210 frees electrode wire 1. The electrode wire can thereafter, as already explained, be further advanced to wire guide knob 8 and to the rolls 10 and 11 of the takeup side. In the place of pressure screw 213 a pump could be used to produce the necessary pressure for fluid 213. In case particularly deep openings 207 are to be bored in workpiece 206, the electrode wire 1 can be advanced several times after part of the operation has taken place. Likewise the usual advancing equipment above the workpiece can be used for this purpose.

The invention as described and shown in the Figures of the drawings provides a universal mechanism for wire or tape electrode erosion machines, widely applicable in its various forms and having the following advantages:

jerk-free and smooth unwinding,
tolerance of any amount of unwinding pull,
precise guiding in the working length,
change of wire direction under elastic bending conditions,
tension regulated pulling,
guiding of the wire in rewinding, gathering or cutting up,
multiple erosion processing by cassettes, and
preparatory erosion of the initial position for threading the electrode wire in the workpiece using the same erosion machine.

Various changes and modifications may be made within the inventive concept without departing from the spirit of the invention. Since a metal tape as used for an electroerosion electrode is in essence a wire of considerably flattened cross-section, it is appropriate to use the word "wire" in connection with these electrodes in a sense which includes both wire and tape and, accordingly, the word "tape" does not appear in the appended claims, but the work "wire" is used in the broad sense just mentioned.

We claim:

1. A mechanism for supplying and guiding at least one electrode wire for electro-erosion cutting of a work piece, comprising:
   an electrode wire supply means (2);
   a wire takeup means (12);
   means (7, 8) guiding said wire between said supply and takeup means in a geometrically defined path with respect to the work piece;
   advancing means including a driven roll (3) and a pressure roll (4) together firmly engaging said wire, for advancing said wire towards said guiding means (7, 8) at a predetermined steady velocity; and
   pulling means, including a second driven roll (10) and a second pressure roll (11) together firmly engaging said wire, for pulling said wire away from said guiding means (7, 8) with constant proportional elongation of said wire, said pulling means including drive means for driving said pulling means at a velocity such as to maintain a constant ratio of the velocities of said wire respectively at said advancing means and at said pulling means, said ratio being chosed for compatibility with the stretching characteristics of said electrode wire,
   both said advancing means and said pulling means being driven independently of said supply means and of said takeup means.

2. A mechanism as defined in claim 1 in which said advancing means and said pulling means are mounted on a common frame (16,17).

3. A mechanism as defined in claim 2 in which said means to feed said electrode wire also comprises motors (5, 14) adapted to be driven in such a manner that said pulling means exerts a constant tension force on said electrode wire taking account of variations in the stretching properties of said electrode wire (FIG. 2).

4. A mechanism as defined in claim 2 in which said advancing means and said pulling means each comprises a drive motor (5,14) individual respectively to said advancing means and to said pulling means 5. A mechanism as defined in claim 2 in which said takeup means comprises a reel (12) on the takeup side of said pulling means and in which said advancing and pulling means each engage said wire so firmly that external disturbances from said supply means (2) and said takeup means reel (12) are prevented from affecting the portion of the electrode wire between said advancing and pulling means.

6. A mechanism as defined in claim 2 in which adjusting means (41, 42, 111, 112) are provided for adjustment of the pressure between the rolls of said advancing means (3, 4) and likewise of the pressure between the rolls of said pulling means (10,11) in order to avoid damage or deformation of said electrode wire and to avoid slipping thereof with respect to said advancing and pulling means and in which the working surface of said rolls is coated with a soft material (44).

7. A mechanism as defined in claim 2 in which each of said electrode guiding means (7,8) comprises one portion (71) made of abrasion-resistant material and another portion (72) made of electrically conducting material having favorable sliding properties, the said two portions being so put together that said electrode wire touches both of said portions in passing over said guide projection, whereby said electrode guiding means serve both to position said electrode wire and to provide the electrical connection necessary for electroerosion cutting of a workpiece (FIG. 4).

8. A mechanism as defined in claim 2 in which said supply means comprises a supply reel, in which said takeup means comprises a takeup reel and in which said supply reel and said takeup reel are mounted on a casette (80), such a casette being provided for each electrode wire (FIG. 6).

9. A mechanism as defined in claim 8 in which a plurality of casettes (80) are provided in the form of a combined multiple-casette unit.

10. A mechanism as defined in claim 8 in which the said casette (80) comprises the said reels, (2, 12), the advancing and pulling means (3, 4, 10, 11) and the said electrode guiding means (7, 8) and in which couplings of the said reels (2, 12) and of the driven rolls (3, 10) of said advancing and pulling means are connected to motors (5, 14, 97) by means of disengageable connections.

11. A mechanism as defined in claim 2 in which said takeup means comprises a takeup reel and in which loop forming means (90, 91, 92, 93, 94) are provided between said pulling means and said takeup reel (FIG. 7).

12. A mechanism as defined in claim 11 in which brake means (96) are provided for adjusting the takeup force of said takeup reel.

13. A mechanism as defined in claim 2 in which said takeup means comprises a container (161) on the takeup side of said pulling means arranged for ordered gathering of said electrode wire (FIG. 8).

14. A mechanism as defined in claim 13 in which said container (161) is rotatable and in which a guide tube (160) leads said electrode wire into said container.

15. A mechanism as defined in claim 2 in which a cutting device (15) at the exit side of said pulling means is adapted to cut up said electrode wire into short lengths (FIGS. 1, 9. 10) for gathering in said takeup means.

16. A mechanism as defined in claim 15 in which said cutting device comprises a knife (152, 172) and electro-magnetic actuating means (151, 177) for said knife.

17. A mechanism as defined in claim 16 in which said knife takes the form of a two-edged vibrating cutter (172).

18. A mechanism as defined in claim 2 in which a clamping means (205) is provided in the neighborhood of one of said electrode guiding means which is nearer said advancing means and so arranged as to enable the formation of a cavity or bore (207) in the workpiece (206), which cavity or bore may serve to define the beginning point of an electro-erosion cutting operation (FIGS. 11, 12).

19. A mechanism as defined in claim 18 in which a clamping means (205) is adapted to clamp fast said electrode wire (1) by means of a constriction tube (210) and in which a free end of said electrode wire projecting out of said constriction tube is adapted to produce a cavity (207) in said work piece (206) such that the depth of said cavity corresponds to the length os said projecting wire end less the erosion thereof during the production of said cavity.

* * * * *